United States Patent
Shi et al.

(10) Patent No.: US 7,660,354 B2
(45) Date of Patent: Feb. 9, 2010

(54) TEMPORAL ERROR CONCEALMENT FOR BI-DIRECTIONALLY PREDICTED FRAMES

(76) Inventors: Fang Shi, 4460 Calle Mar De Amonia, San Diego, CA (US) 92130; Seyfullah Halit Oguz, 5240 Fiore Ter., Apt. 417, San Diego, CA (US) 92122; Vijayalakshmi R. Raveendran, 4272 Calle Mar De Ballenas, San Diego, CA (US) 92130

( * ) Notice: Subject to any disclaimer, the term of this patent is extended or adjusted under 35 U.S.C. 154(b) by 338 days.

(21) Appl. No.: 11/432,030

(22) Filed: May 10, 2006

(65) Prior Publication Data

US 2006/0269153 A1 Nov. 30, 2006

Related U.S. Application Data

(60) Provisional application No. 60/680,278, filed on May 11, 2005.

(51) Int. Cl.
*H04N 7/12* (2006.01)
*H04B 1/66* (2006.01)

(52) U.S. Cl. .................................. 375/240.15

(58) Field of Classification Search ............. 375/240.15
See application file for complete search history.

(56) References Cited

U.S. PATENT DOCUMENTS

| 5,410,553 | A | * | 4/1995 | Choon ....................... 714/747 |
| 5,621,467 | A | * | 4/1997 | Chien et al. ............. 375/240.15 |
| 5,638,128 | A | * | 6/1997 | Hoogenboom et al. . 375/240.15 |
| 6,005,624 | A | * | 12/1999 | Vainsencher ........... 375/240.14 |
| 6,075,899 | A | * | 6/2000 | Yoshioka et al. ............ 382/233 |
| 2006/0133495 | A1 | * | 6/2006 | Ye et al. ................. 375/240.16 |
| 2006/0215761 | A1 | * | 9/2006 | Shi et al. ................. 375/240.16 |
| 2007/0014359 | A1 | * | 1/2007 | Gomila et al. ......... 375/240.16 |

* cited by examiner

*Primary Examiner*—Nhon T Diep

(57) ABSTRACT

A method and apparatus to process erroneous bi-directionally predicted multimedia data is described. The method includes determining temporal prediction data for the erroneous multimedia data, and estimating the erroneous multimedia data based on the determined temporal prediction data. The temporal prediction data includes data that was used to predict a forward reference section and/or a backward reference section. In some aspects, the temporal prediction data comprises motion vector data of the reference frames which is scaled to correspond to a frame containing the erroneous data.

60 Claims, 11 Drawing Sheets

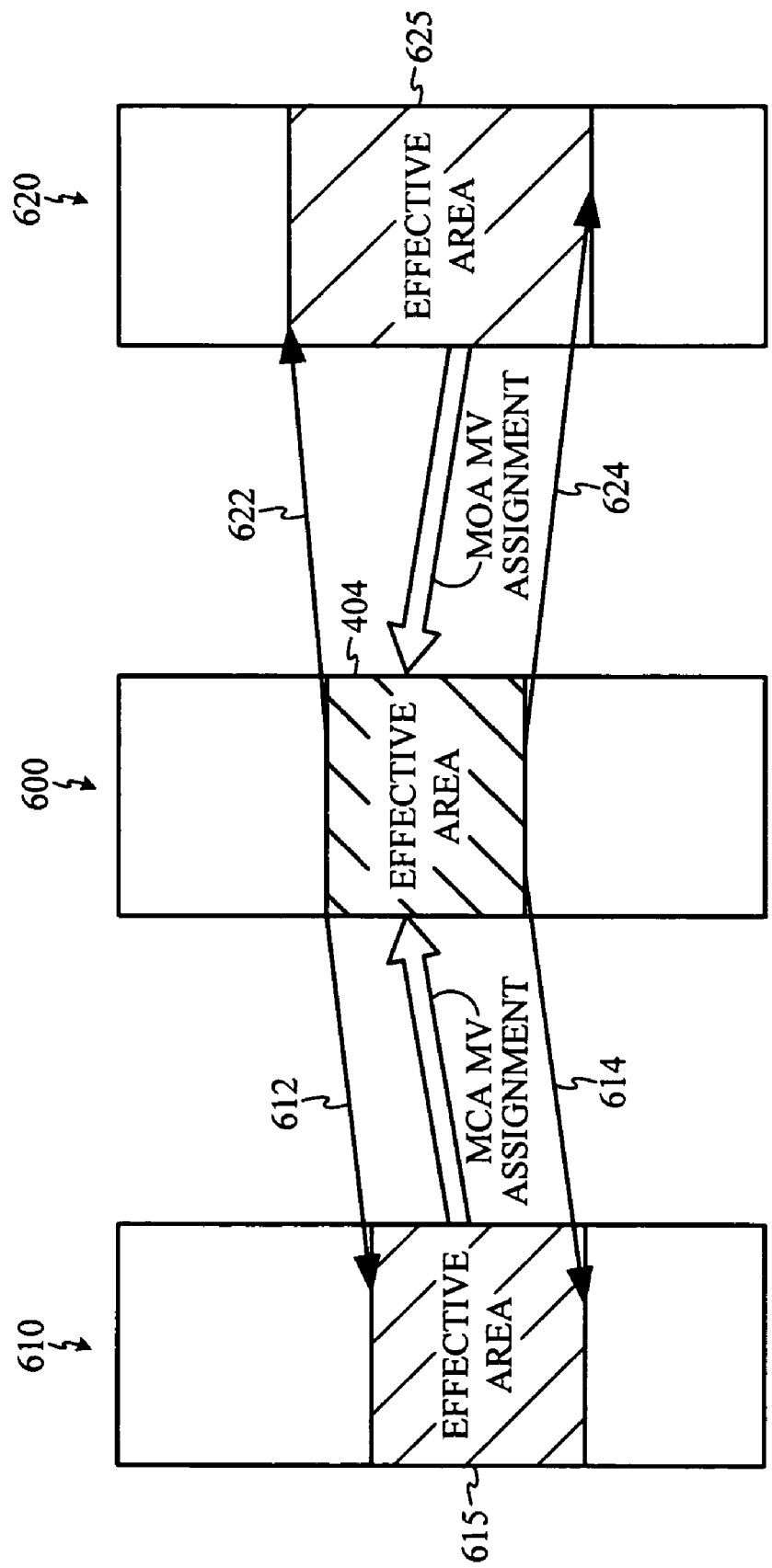

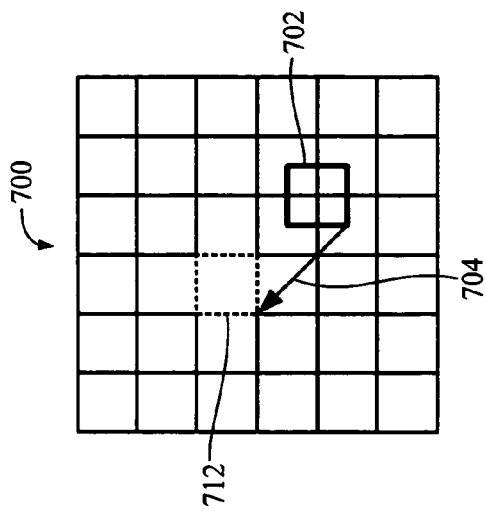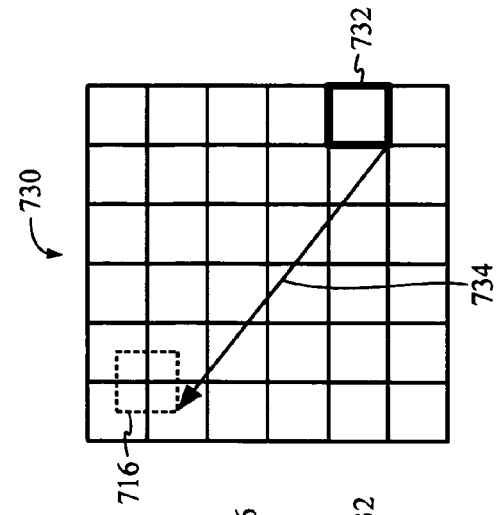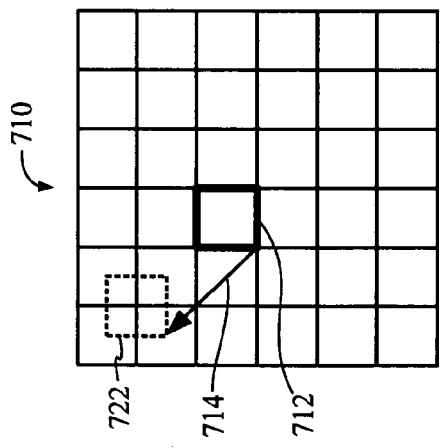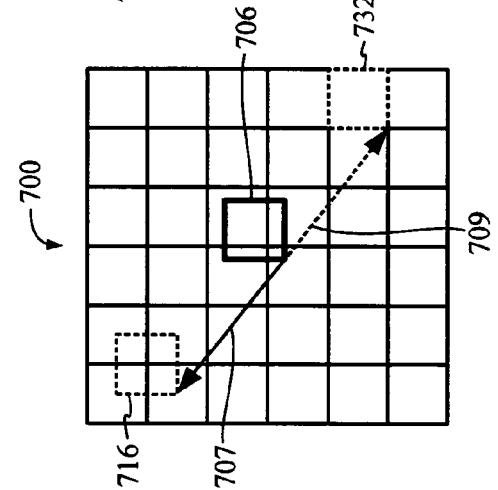
FIG. 7A    FIG. 7B
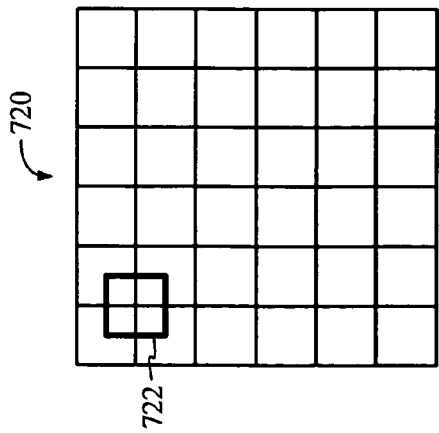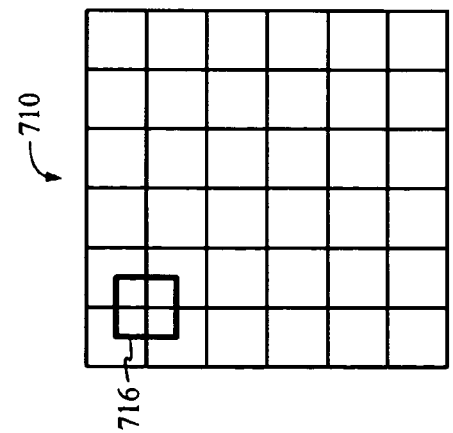

910 ↘

| 0 | 1 | 4 | 5 |
| 2 | 3 | 6 | 7 |
| 8 | 9 | 12 | 13 |
| 10 | 11 | 14 | 15 |

RIGHT NEIGHBOR

920 ↘

| 0 | 1 | 4 | 5 |
| 2 | 3 | 6 | 7 |
| 8 | 9 | 12 | 13 |
| 10 | 11 | 14 | 15 |

TOP NEIGHBOR

930 ↘

| 0 | 1 | 4 | 5 |
| 2 | 3 | 6 | 7 |
| 8 | 9 | 12 | 13 |
| 10 | 11 | 14 | 15 |

LEFT NEIGHBOR

940 ↘

| 0 | 1 | 4 | 5 |
| 2 | 3 | 6 | 7 |
| 8 | 9 | 12 | 13 |
| 10 | 11 | 14 | 15 |

BOTTOM NEIGHBOR

FIG. 9

TEMPORAL ERROR CONCEALMENT FOR BI-DIRECTIONALLY PREDICTED FRAMES

CROSS-REFERENCE TO RELATED APPLICATIONS

The present Application for Patent claims priority to Provisional Application No. 60/680,278 entitled "A METHOD AND APPARATUS FOR TEMPORAL ERROR CONCEALMENT" filed May 11, 2005, and assigned to the assignee hereof and hereby expressly incorporated by reference herein.

BACKGROUND OF THE INVENTION

1. Field of the Invention

This invention relates to methods and apparatus for encoding and decoding multimedia data such as video data or audio data with error management.

2. Description of the Related Art

Widespread use of the Internet and wireless communication has increased demand for multimedia services that stream media over the Internet and mobile/wireless channels. In Internet Protocol (IP) networks, video can be provided by a server and can be streamed by one or more wired or wireless clients. Wired connections include dial-up, integrated services digital network (ISDN), cable, digital subscriber line protocols (collectively referred to as xDSL), fiber, local area networks (LAN), wide area networks (WAN) and others. Electronic devices utilizing wireless communications include telephones (e.g., cell phones), personal data assistants (PDAs), hand-held and portable computers and others. In most, if not all of these applications, bandwidth requirements and/or restrictions necessitate that video processing utilize a source encoder incorporating video compression algorithms to analyze, quantify and represent video data to convey the maximum information by expending a "minimum" number of bits. Characteristics of video processing using compressions algorithms can vary significantly based on content, which can lead to large scale variations in their performance (such as compression efficiency and bit rate).

Wireless channels are prone to errors. A part of transmitted data is "erroneous" if it is lost or corrupt. Because video compression inherently removes redundancy, the compressed data becomes critical. Any data that becomes erroneous during transmission may impact reconstructed video quality at the decoder. The impact is aggravated if the erroneous data is part of the reference frame for motion compensated prediction, causing temporal error propagation.

To alleviate impact on reconstructed video quality due to erroneously received bitstream data, the video decoder processes the received video data to improve video quality. This is referred to as error concealment. Error concealment schemes make use of the spatial and temporal correlation that exists in the video signal. Accordingly, these schemes are called spatial or temporal error concealment.

Depending on the nature of the channel errors (bit errors and/or packet loss) and the type of packetization, all or part of the data pertaining to one or more macroblocks or slices could be erroneous during transmission. For a macroblock, various coded macroblock data could be erroneous, which includes one or more of the following: coding mode (inter or intra), motion vectors (if inter), and transform coefficients.

If a macroblock is erroneous, it is typically assumed that all of the above information is erroneous. For an inter-coded macroblock, its motion vectors and residual coefficients are erroneous. Since residual signals are highly de-correlated, they are hard to estimate from neighboring macroblocks. However, studies have shown that reconstructed video quality may be greatly improved if motion vectors can be recovered. Hence, the main goal of temporal error concealment is to estimate the erroneous motion vectors from its spatial and temporal neighbors. Once the motion vector is constructed, motion compensation can then be performed using the constructed motion vector with zero residual coefficients.

Although there are several existing temporal error concealment schemes, they fail to offer good results. Moreover, they are not compatible with bi-directionally predicted multimedia data and/or variable motion compensation block sizes. Therefore, a new temporal error concealment scheme is needed to achieve improved results and provide wider compatibilities.

SUMMARY OF THE INVENTION

A method of processing bi-directionally predicted multimedia data, where the data includes a first section received in error, is provided. The method includes determining temporal prediction data for the first section received in error, wherein the temporal prediction data corresponds to a first forward reference section and a first backward reference section. The method further includes estimating the first section based on at least one of the first forward reference section and the first backward reference section.

A processor for processing bi-directionally predicted multimedia data, where the data includes a first section received in error, is provided. The processor is configured to determine temporal prediction data for the first section received in error, where the temporal prediction data corresponds to a first forward reference section and a first backward reference section. The processor is further configured to estimate the first section based on at least one of the first forward reference section and the first backward reference section.

An apparatus for processing bi-directionally predicted multimedia data, where the data includes a first section received in error, is provided. The apparatus includes a determiner to determine temporal prediction data for the first section received in error, where the temporal prediction data corresponds to a first forward reference section and a first backward reference section. The apparatus also includes an estimator to estimate the first section based on at least one of the first forward reference section and the first backward reference section.

A computer readable medium embodying a method of processing bi-directionally predicted multimedia data, where the data includes a first section received in error. The method includes determining temporal prediction data for the first section received in error, wherein the temporal prediction data corresponds to a first forward reference section and a first backward reference section. The method further includes estimating the first section based on at least one of the first forward reference section and the first backward reference section.

BRIEF DESCRIPTION OF THE DRAWINGS

FIG. 6 illustrates a method of limiting the reference areas of the forward and backward reference frames for determining the temporal prediction data.

FIGS. 7A and 7B illustrate examples of motion vector scaling.

FIG. 9 illustrates 4×4 pixel blocks of macroblocks neighboring an erroneous macroblock.

DETAILED DESCRIPTION OF THE PREFERRED EMBODIMENT

A method and apparatus to process bi-directionally predicted multimedia data received in error, comprising determining temporal prediction data for the multimedia data received in error, and estimating the multimedia data received in error based on the determined temporal prediction data are described. The temporal prediction data may correspond to a forward reference section and/or a backward reference section. In one aspect the temporal prediction data may comprise motion vectors corresponding to the forward reference section and/or the backward reference section. Processing of the temporal prediction data, e.g., the motion vectors, may comprise scaling, merging, and smoothing operations. In the following description, specific details are given to provide a thorough understanding of the disclosed methods and apparatus. However, it is understood by one of ordinary skill in the art that the disclosed methods and apparatus may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated if its operations are completed. A process may correspond to a method, a function, a procedure, a subroutine, a subprogram, etc. If a process corresponds to a function, its termination corresponds to a return of the function to the calling function or the main function.

Figure 1:
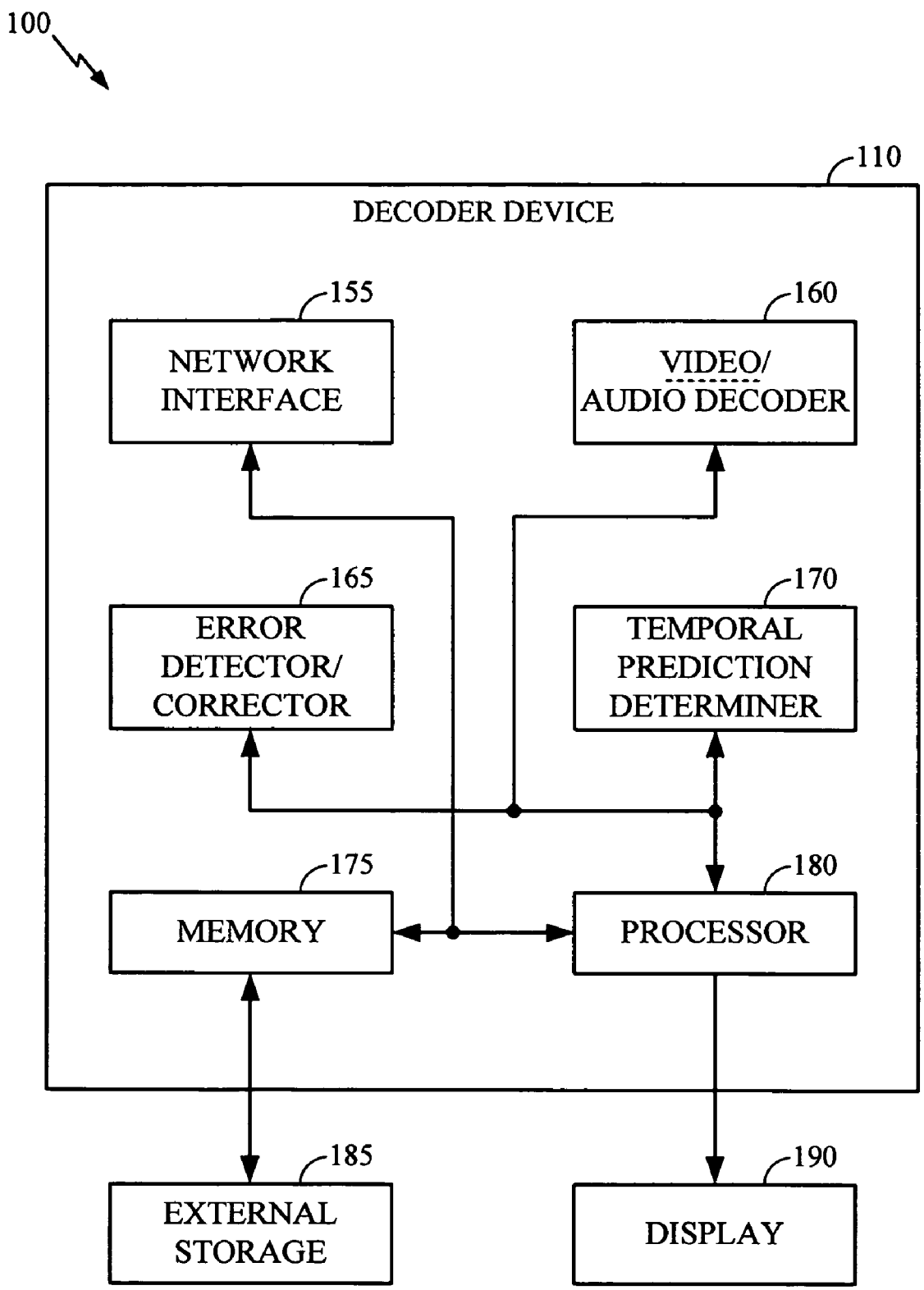
FIG. 1 shows a block diagram illustrating an example of a decoder system for decoding and displaying an incoming multimedia data stream (not shown).

FIG. 1 shows a block diagram illustrating an example of a decoder system configured to decode an incoming multimedia data stream (not shown). The multimedia data can be of various forms including, but not limited to, video, audio, graphics, text, and pictures. The data can be compressed video and audio as in the MPEG-x and H.26x standards, compressed audio as in the MPEG-4 AAC, MP3, AMR and G.723 audio or voice compression standards, or any other type of digital data. The data stream can be received via a wired network such as telephone, cable, and fiber optic, or a wireless network. In the case of wireless, the network can comprise, for example, part of a code division multiple access (CDMA or CDMA2000) communication system or alternately, the system can be a frequency division multiple access (FDMA) system, an orthogonal frequency division multiplex (OFDM) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques.

The system 100 includes decoder device 110, external storage 185 and a display 190. The example decoder device 110 comprises a network interface 155, a video and/or audio decoder 160, an error detector/corrector 165, a temporal prediction determiner 170, a memory 175 and a processor 180. The network interface 155 can receive the encoded multimedia data, (such as MPEG-4 or H.264 compressed video data), from a network or an image source such as the internal memory component 175 or the external storage 185. The encoded multimedia data may be MPEG-4 or H.264 compressed video data. The memory component 175 and/or the external storage 185 may be a digital video disc (DVD) or a hard-disc drive that contains the encoded video data.

The video/audio decoder 160 is configured to decode any of various types of encoded data. Encoded data can be compressed data, transformed data, quantized data, or any combination thereof. Encoded data may comprise multimedia data such as video, audio, closed captioning, graphics or any combination thereof.

The error detector/corrector 165 is configured to perform one or more of various error detection and/or correction schemes. Encoded data may include various schemes to provide for error resiliency. Error prone channels such as wireless and/or wired networks may introduce errors into the bitstream received by decoder 110. Such error resiliency schemes may include one or more error control coding schemes, interleaving schemes and other schemes that are known to those of skill in the art. The error detector/corrector 165 includes corresponding error decoding components that enable detection and correction of errors. Some errors that are introduced over networks may not be correctable by the error corrector/detector 165. For those errors that are not correctable, solutions requesting retransmission of corrupt components may not be feasible for some situations. For situations where the decoder 110 may not have the option of requesting retransmission of erroneous data, error recovery may be used. Error recovery may include various forms of temporal and/or spatial concealment methods.

The temporal prediction determiner 170 is configured to perform temporal error concealment of erroneous inter-coded data. In particular, the temporal prediction determiner 170 is configured to perform temporal error concealment of bi-directionally predicted inter-coded data. Inter or predictive coding refers to encoding a picture (a field or a frame) with reference to one or more other pictures. Examples of inter-coded pictures that are used throughout this application are predicted frames (either forward or backward predicted, referred to as "P-frames") and bi-directional predicted frames (predicted from two frames such as a forward frame and a backward frame, referred to as "B-frames"). Due to the bi-directional motion compensation feature of B-frames, the compression efficiency for a B-frame may be higher than those of I-frames or P-frames. Consequently, B-frame sizes are typically considerably smaller than I- and P-frame sizes. Thus, the area lost due to an erroneous set of data of a given size may be larger for a B-frame than it would be for a P-frame or an I-frame. Frames of all types (P, B and/or I) may include both inter and intra coded regions. Other terms for inter-coding include high-pass coding, residual coding, motion compensated interpolation and others that are well known to those of ordinary skill in the art. B-frames (or any inter-coded sections) can exploit temporal redundancy between a region in a current frame and best matching prediction regions in two other reference frame. The best matching regions may be combined by averaging, weighted averaging and other methods known to those of skill in the art. The difference between the current region and the combined best matching reference prediction region is known as residual error (or prediction error). The locations of the best matching prediction regions in the reference frames can be encoded in a forward motion vector that points to a frame in a forward reference frame list, and a backward motion vector that points to a frame in a backward reference frame list.

The processor 180 may be any suitable general purpose single- or multi-chip microprocessor, or any suitable special purpose microprocessor such as a digital signal processor, microcontroller, or a programmable gate array. The processor 180 is configured to execute one or more software applications to control the operation of the network interface 155, the video/audio decoder 160, the error detector/corrector 165, the temporal prediction determiner 170 (and the sub-components shown in FIG. 2) and the display 190. The processor 180 is also configured to access the memory 175, or the external storage 185 to read and/or store data.

Figure 2:
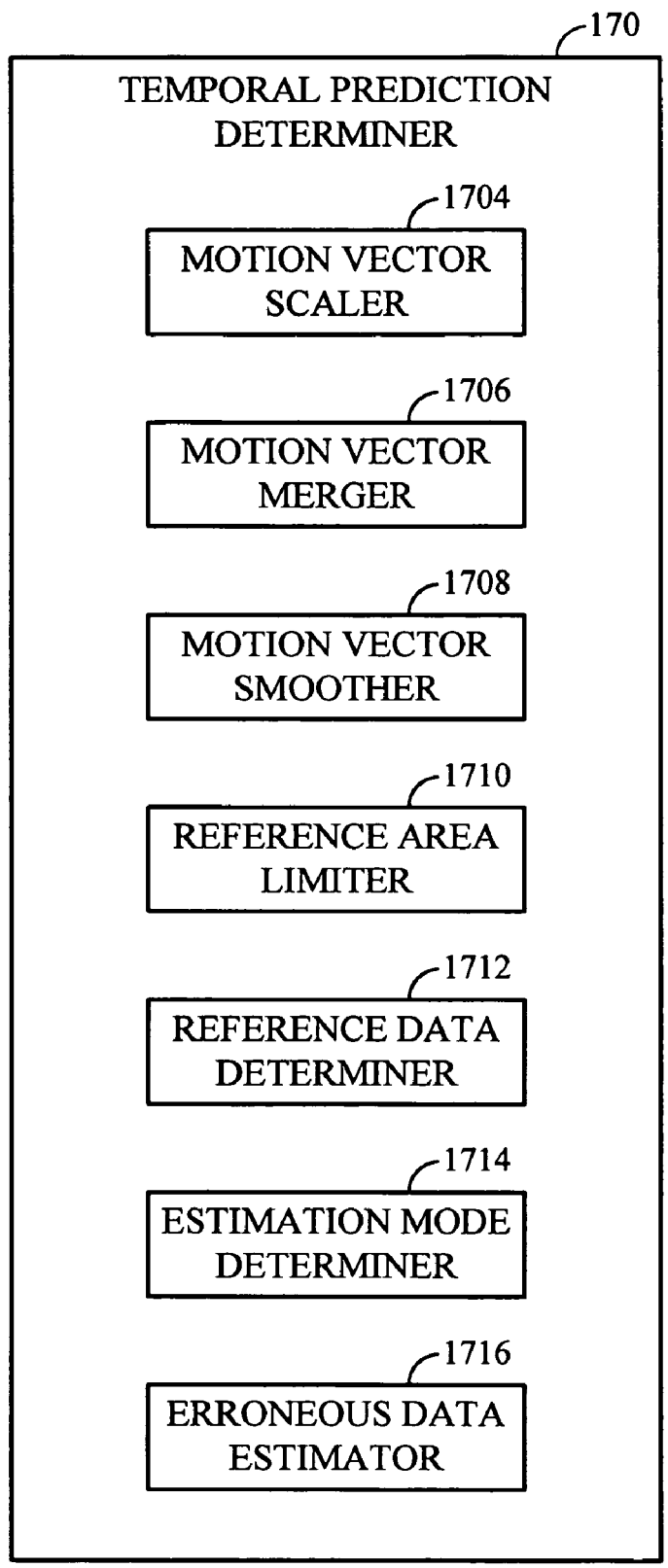
FIG. 2 shows a block diagram illustrating a more detailed example of the temporal prediction determiner 170 shown in FIG. 1 may comprise.

FIG. 2 shows a block diagram illustrating certain sub-components that the temporal prediction determiner 170 may comprise. The sub-components of the temporal prediction determiner 170 shown in FIG. 2 may comprise a motion vector scaler 1704, a motion vector merger 1706, a motion vector smoother 1708, a reference area limiter 1710, a reference data determiner 1712, an estimation mode determiner 1714, and an erroneous data estimator 1716. The temporal prediction determiner 170 is configured to obtain temporal prediction data corresponding to one or more reference frames from which groups of pixels comprising the erroneous bi-directionally predicted data can be estimated. The temporal prediction determiner 170 may operate on any sized portion of the multimedia data. The portion of data may be any size N×M pixels, where N and M are integers. In one example, a base unit for operation of the temporal prediction determiner 170 is a macroblock. A macroblock is a group of associated pixels, and in this example is made up of 16×16 pixels. Pixels can be defined by an 8-bit luminance value (Y) and two 8-bit chrominance values (Cr and Cb). In MPEG, Y, Cr and Cb components can be stored in a 4:2:0 format, where the Cr and Cb components are down-sampled by 2 in the X and the Y directions. Hence, each macroblock would consist of 256 Y components, 64 Cr components and 64 Cb components.

It should be noted that any one of the components illustrated in FIGS. 1 or 2 may be rearranged and/or combined with one or more other components without changing the function of the decoder. For example, the processor 180 may be external to the decoder device 110, or the video decoder 160 may be combined with the corrector 165 and determiner 170. In certain examples, one or more of the components illustrated in FIGS. 1 or 2 may be removed.

Figure 3:
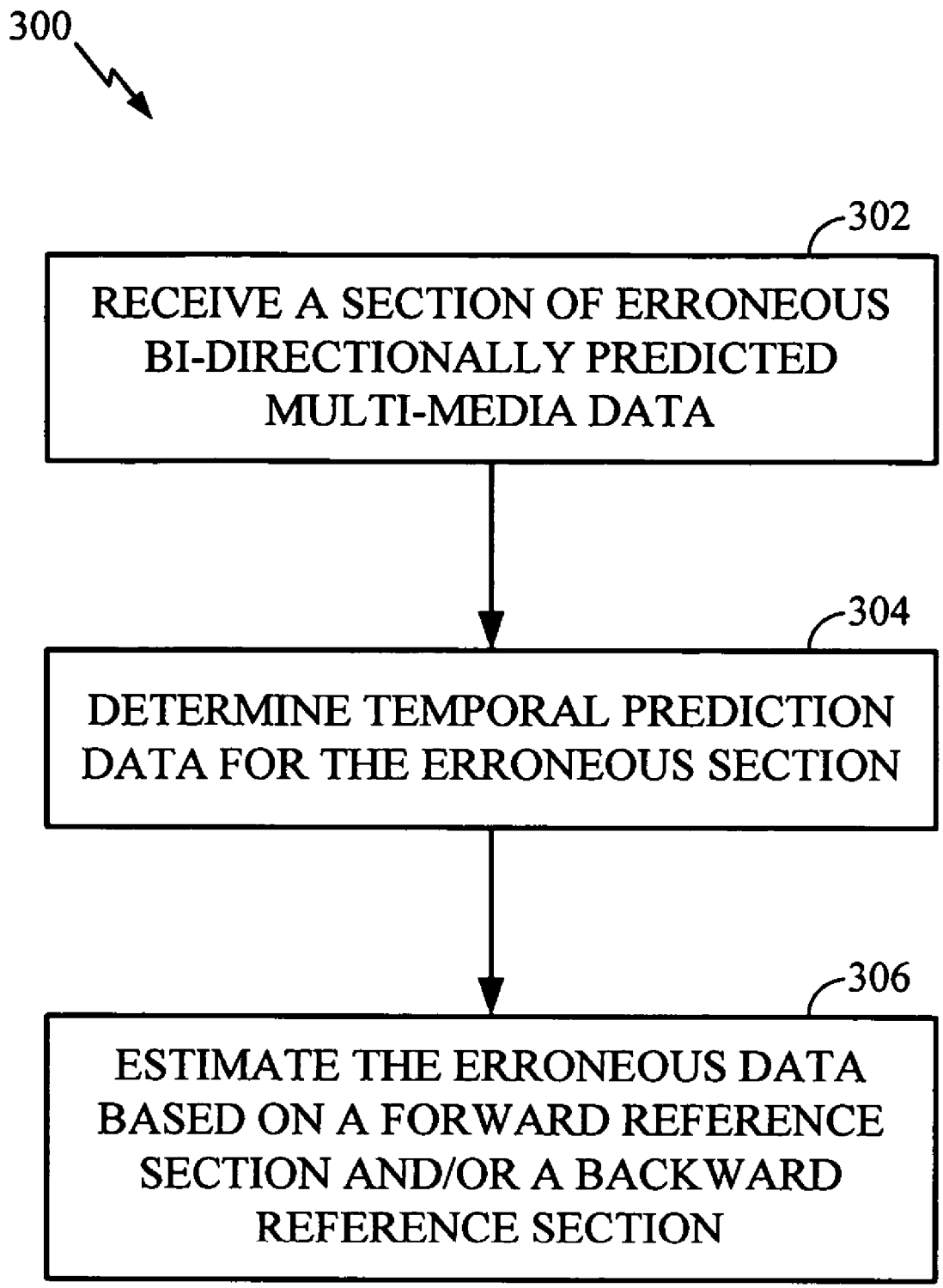
FIG. 3 shows a flow chart illustrating certain blocks in a method of processing erroneous bi-directionally predicted multimedia data.

FIG. 3 shows a flow chart illustrating an example of a method of temporal error concealment to process erroneous bi-directionally predicted multimedia data. In this example, the method of temporal error concealment derives an estimate of forward and backward temporal prediction data for an erroneous section of bi-directionally predicted data. The temporal prediction data to be estimated may be a forward motion vector and/or a backward motion vector directed to (or pointing to) a forward reference frame and a backward reference frame, respectively. The estimated motion vectors may be based partly on the motion vectors of sections of data in the forward and/or backward reference frames. The erroneous section and the reference sections of data may be of any shape or size, e.g., base units as discussed above, and may be comprised of pixels. The estimated motion vectors may also be based partly on the motion vectors of non-corrupted blocks of data in the same frame as the erroneous data.

The method 300 begins where the decoder device 110, shown in FIG. 1, receives 302 an erroneous section of bi-directionally predicted multi-media data. The erroneous data may be received by the network interface 155 and, in this example, some of the received errors may be uncorrectable by the error detector/corrector 165. The erroneous data may then be processed by the temporal prediction determiner 170. The error detector/corrector 165 may mark or flag the section of multimedia data in error. Processor 180 may then identify erroneous sections to be concealed by the temporal prediction determiner 170.

The temporal prediction determiner 170 determines 304 temporal prediction data for the erroneous section. The forward and backward temporal prediction data can be used to estimate 306 the erroneous section in the current frame. The determined temporal prediction data may comprise a forward motion vector and/or a backward motion vector corresponding to regions of the erroneous section. The determined forward motion vector can point to a forward frame in a sequence of frames and the determined backward reference vector points to a backward frame in the sequence, where forward and backward are directions in the sequence relative to a current frame containing the erroneous data. The forward reference section and the backward section may be any size portions. Determining means such as reference data determiner 1712 may determine 304 the temporal prediction data. Further details of determining 304 are discussed below with respect to FIG. 5A.

The temporal prediction data can be used to locate sections of multimedia data that correspond to the erroneous sections of the current frame. The erroneous section of data being processed by the method 300 may be a group of pixels of any shape or size. One example which is used for explanation of the method 300 is a block of pixels. A block of pixels may comprise N×M pixels where N and M are integers. Method 300 is described using macroblocks (16 pixels by 16 pixels) as a base unit or section of erroneous data to be estimated. Estimating means such as erroneous data estimator 1716 may estimate 306 the erroneous data. It should be noted that any one of the blocks illustrated in the flowchart shown in FIG. 3 may be omitted, rearranged in order, or combined with one or more other blocks.

Figure 4:
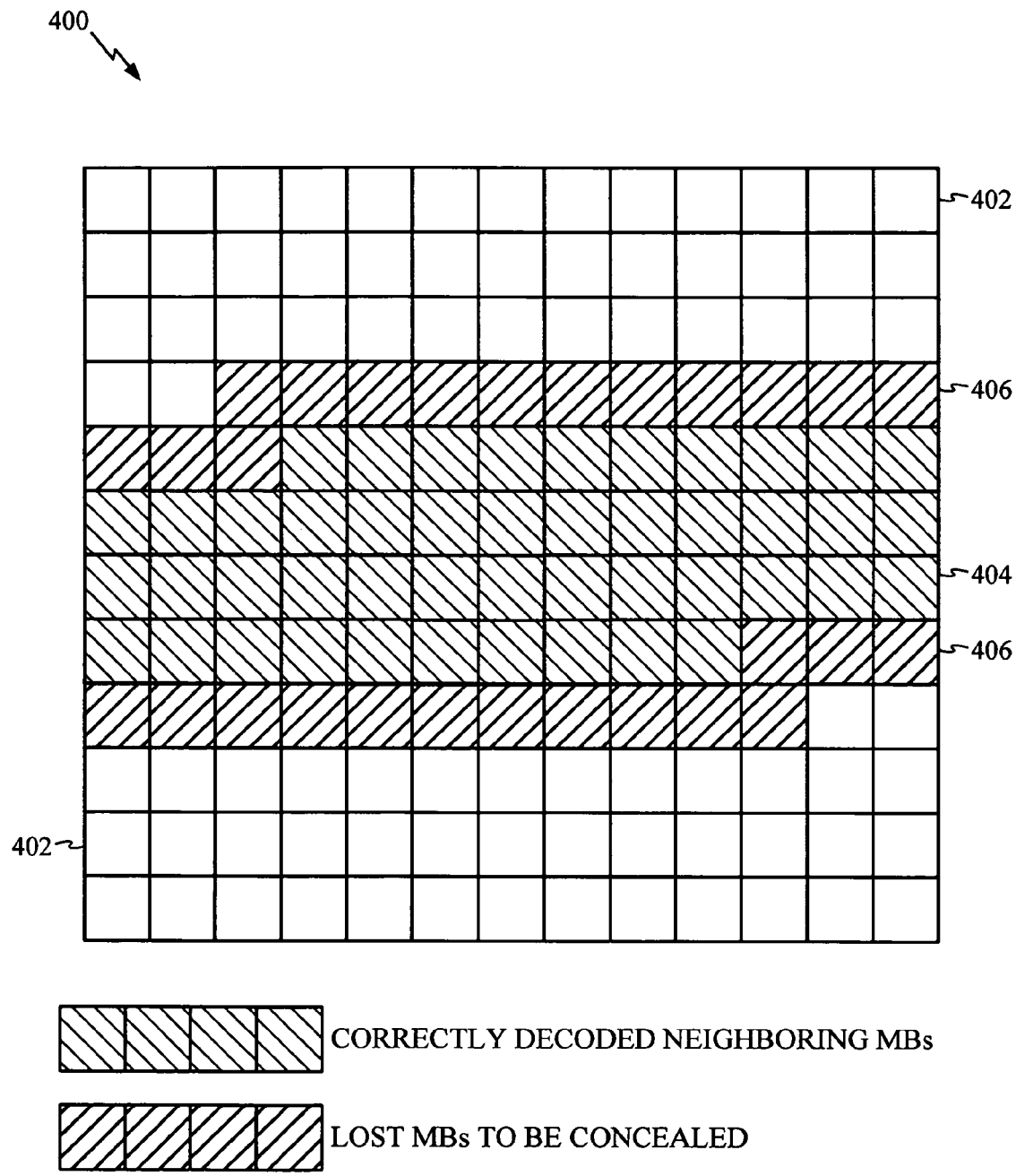
FIG. 4 illustrates a group of macroblocks comprising correctly received and decoded macroblocks and macroblocks received in error.

The section received in error, at 302, may be part of a larger portion of erroneous data of any shape or size. FIG. 4 illustrates a group of macroblocks comprising correctly received and possibly decoded macroblocks and macroblocks received in error. Frame 400 is a frame containing 12×13 macroblocks, where the number of macroblocks is an example. The frame 400 includes non-erroneous macroblocks 402 and erroneous macroblocks 404. The frame 400 also includes non-erroneous macroblocks 406 that are neighboring the erroneous macroblocks 404. Erroneous macroblocks 404 may be members of one or more groups of independently decodable macroblocks known as slices. A slice may have an initial portion that is non-erroneous and may be able to be properly decoded followed by an erroneous portion. Also, the slice may then have an erroneous portion somewhere in the middle. In some cases, the remainder of the slice occurring after the erroneous middle portion may also be erroneous due, at least in part, to the nature of context adaptive coding, where the method of encoding (and therefore the method of decoding) depends on knowing the context of preceding data. Thus, a portion of a slice, e.g. one or more blocks of data, may be erroneous, or an entire slice, multiple slices or an entire frame (or more) may be erroneous. A slice may correspond to a row or rows of macroblocks, to a column or column of macroblocks, a block of macroblocks, or an entire frame of macroblocks.

Figure 5A:
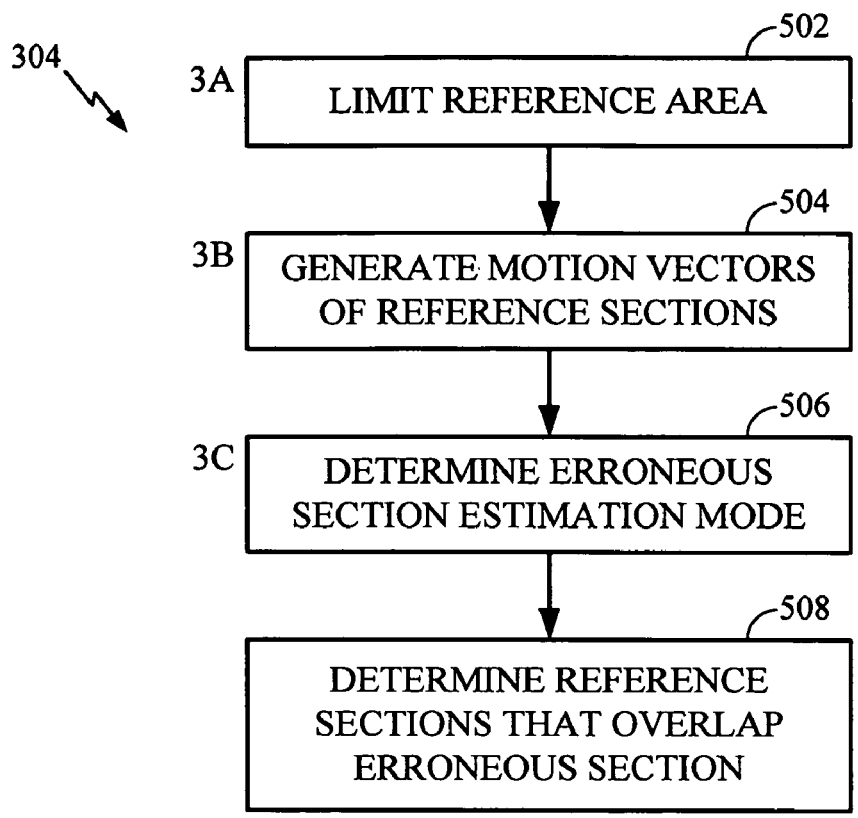
FIG. 5A shows a flow chart illustrating an example of the process to determine temporal prediction data at block 304 of FIG. 3.

FIG. 5A shows a flow chart illustrating a more detailed example of the process to determine temporal prediction data at block 304 of FIG. 3. At optional block 502, the reference sections of the forward and/or the backward reference frames are limited to one or more areas within the reference frames (e.g., one or more groups of macroblocks). Instead of processing the entire forward and/or the backward reference frames to determine the temporal prediction data and to estimate the erroneous section of the current frame, the limited reference areas can be processed. Limiting the reference area focuses the reference information to select portions or regions of the reference frames and reduces the processing power and/or processing time used in process 300. Details of an example of a process for limiting the reference areas of the reference frames is discussed below in reference to FIG. 5B.

After optionally limiting 502 the reference areas of the forward reference frame and the backward reference frame, the temporal prediction determiner 170 generates 504 motion vectors for the erroneous section to be used to estimate 306, and thus conceal, the erroneous data of the current frame. The motion vectors generated at 504 may be based on the motion vectors used in the inter-coding of the forward and/or backward reference sections (e.g., macroblocks of a forward frame and/or a backward frame). In this example, the motion vectors for the erroneous section are generated by processing the motion vectors of the limited 502 reference areas of the reference frames. Motion compensated prediction is based on an assumption that a section of video in one frame may be predicted on the same or similar section of video in another frame, even if located at a different spatial position in the other frame. If it is assumed that the motion of the predicted reference section was continuous (e.g., in a linear fashion), then the motion vector may be interpolated or extrapolated in order to determine motion vectors for the erroneous section based on the motion vectors used to predict the reference sections. Two motion vectors may be generated, one forward and one backward, for each erroneous bi-directionally predicted section. Additional details for generating 504 motion vectors corresponding to the erroneous section are discussed below with respect to FIG. 5C.

After generating the motion vectors at 504, the estimation mode determiner 1714 of FIG. 2 may optionally determine 506 an estimation mode to be used to estimate the erroneous section. Since two reference frames (the forward and the backward reference frames) are available for estimation purposes, four possible modes of estimating each erroneous base unit section are available. The estimation modes include two unidirectional modes, each using a single determined motion vector points to the backward reference frame or the forward reference frame, and a bi-directional mode using two determined motion vectors, one pointing to the forward reference frame and one pointing to the backward reference frame. The fourth mode does not use any motion vectors (e.g., spatial concealment). Methods used to determine 506 the estimation mode is discussed in more detail below.

To estimate the erroneous section, the reference data determiner 1712 of FIG. 2 determines 508 possible reference sections with motion vectors generated 504 that result in overlap of the erroneous sections to be concealed. The determining 508 may comprise analyzing the scaled motion vectors to identify one or more candidate reference sections in the forward and/or backward reference frames where the scaled motion vectors result in an overlap of the erroneous section being concealed.

After determining 508 the relevant reference sections, e.g., using the forward and/or backward motion vectors that resulted in overlap of the erroneous section, the erroneous data estimator 1716 of FIG. 2 estimates 306 (see FIG. 3) the erroneous section. The estimation 306 may use standard temporal prediction algorithm using the scaled motion vector(s) and the video data of the reference sections pointed to by the scaled motion vector(s). Standard temporal prediction algorithms include, but are not limited to, the motion compensated prediction algorithms used in MPEGx and H.26x standards. As discussed above, a bi-directional mode of estimating 306 the erroneous data may be used if scaled motion vectors in both the forward and the backward frame are determined 508 to result in overlap of the erroneous section. Unidirectional prediction methods may be used to estimate 306 the erroneous data if one (a forward or a backward) motion vector is determined 508 to result in overlap of the erroneous section. In some examples, the residual error data that is normally used in the motion compensated prediction algorithms are set to zero.

Figure 5B:
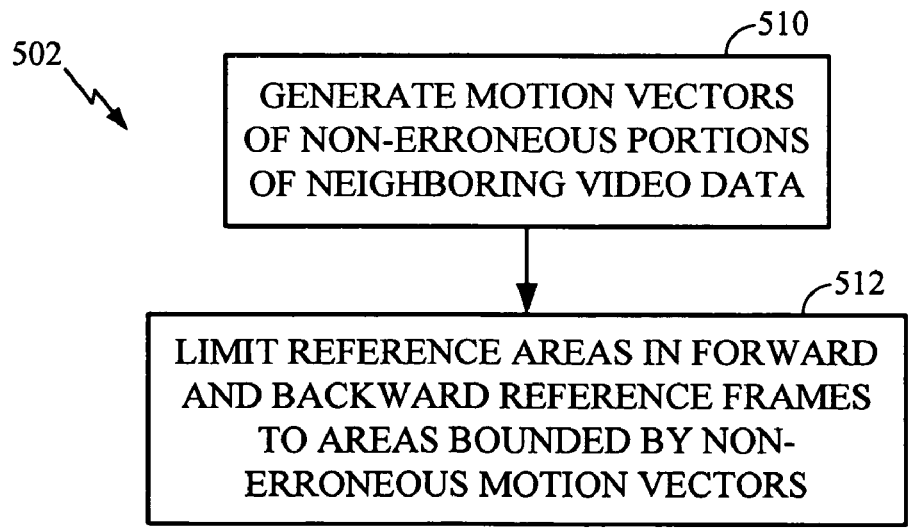
FIG. 5B shows a flow chart illustrating an example of the process to limit the reference area at block 502 of FIG. 5A.

FIG. 5B shows a flow chart illustrating a detailed example of the process to limit 502 the reference area for determining 304 the temporal prediction data. Some example methods to limit 502 the reference area utilize motion vectors of the non-erroneous macroblocks 406 shown in FIG. 4 that are neighboring the erroneous macroblocks 404. Reference area limiter 1710, of FIG. 2, generates 510 a set of motion vectors corresponding to the non-erroneous portions of macroblocks 406 neighboring the erroneous macroblocks 404. The non-erroneous macroblocks 406 may each have one motion vector, or they may have multiple motion vectors for various sized sub-macroblocks. Sub-macroblocks may include various numbers of pixels such as, for example, 16×8, 8×16, 8×8, 8×4, 4×8, 4×4 and others. The non-erroneous motion vectors generated 510 contain orthogonal components "x" and "y" that locate a reference section in a forward and/or backward reference frame. The motion vectors may also include a frame number or other type of data identifying the location of the reference frame relative to the current frame containing the predicted macroblock (or sub-macroblock).

After generating 510 the list of motion vectors corresponding to the neighboring non-erroneous portion of macroblocks 406, the reference area limiter 1710 limits 512 the reference areas in the forward and/or backward reference frames to areas bounded by the generated non-erroneous motion vectors. FIG. 6 illustrates an example process to limit 512 the reference areas based on the non-erroneous neighboring motion vectors. Frame 600 is the current reference frame containing the erroneous macroblocks 404. Frame 610 is the forward reference frame and frame 620 is the backward reference frame. In the example illustrated in FIG. 6, the erroneous data comprises a slice of macroblocks that extends horizontally in the current frame 600 from one side to the other (such as erroneous section 404 in FIG. 4). The list of motion vectors generated 510 is used to limit the reference areas of the forward reference frame 610 and the backward reference frame 620 to a limited forward reference area 615 and a limited backward reference area 625, respectively. By limiting the forward and backward reference areas to the areas bounded by the motion vectors corresponding to the non-erroneous neighboring macroblocks 406, an effective search may be accomplished with limited processing power and time.

The limited forward reference area 615 may be bounded on the top and bottom by rows of macroblocks pointed to by a forward top-most motion vector 612 and a forward bottom-most motion vector 614, respectively. The limited backward reference area 625 may be bounded on the top and bottom by the rows of macroblocks pointed to by a backward top-most motion vector 622 and a backward bottom-most motion vector 624, respectively. The top-most motion vectors 612 and 622 may be generated by choosing, from amongst the non-erroneous neighboring motion vectors, the ones that point to the highest location in the forward frame 610 and the backward reference frame 620, respectively. The bottom-most motion vectors 614 and 624 may be generated by choosing, from amongst the non-erroneous neighboring motion vectors, the ones that point to the lowest location in the forward frame 610 and the backward reference frame 620, respectively. Alternatively, the limited reference areas 615 and 625 may be defined on a column by column basis. A columns limited reference area may be limited by highest pointing and lowest pointing motion vectors of sub-macroblocks contained in a non-erroneous macroblock in the column. In addition, the limited areas 615 and 625 may also be bounded on the right and left by a right-most motion vector and a left most motion vector (not shown). Other methods to limit 612 the forward and/or backward reference areas are apparent to those of skill in the art. It should be noted that any one of the blocks illustrated in the flowchart shown in FIG. 5B may be omitted, rearranged in order, or combined with one or more other blocks.

Figure 5C:
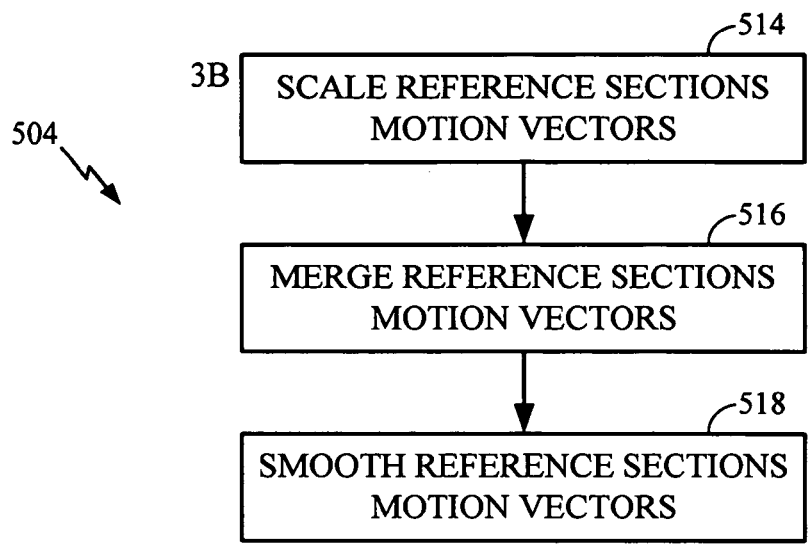
FIG. 5C shows a flow chart illustrating an example of the process to generate the motion vectors at block 504 of FIG. 5A.

FIG. 5C shows a flow chart illustrating a detailed example of the process to generate 504 the motion vectors based on the forward and backward reference sections of FIG. 5A. In some examples, the forward and backward reference sections comprise decoded multimedia data and the motion vector data used to decode the sections. As discussed above, certain examples of a video communication system require the decoder to support variable motion compensation block sizes. In such examples, one of the inputs to the decoder is the motion vector of each decoded block of variable sizes. The other input is a reference frame index (ref_idx) for each motion vector from the decoded frame. Reference frame index information is carried in the bitstream for each motion vector, indicating the distance between the predicted frame and its motion vector's reference frame. In one example, there are seven valid motion compensation block sizes for each macroblock. These block sizes are 16×16, 16×8, 8×16, 8×8, 8×4, 4×8, and 4×4. In this example, the process to generate 504 motion vectors for variable motion compensation block sizes by converting the reference motion vectors into motion vectors based on a single immediate reference frame and a uniform reference block size (e.g., 16 by 16 pixel blocks).

To generate motion vectors for the current frame containing the erroneous section, the motion vector scaler 1704 of FIG. 2 scales 514 the motion vectors that were used in predicting the reference sections of the forward and backward reference frames. In this example of motion vector scaling, the scaling is based on a comparison of distances between the current frame and the reference frame and the frame from which the reference frame is predicted. After motion vector scaling, a pair of motion vectors are pointed from the current frame to a forward reference frame and a backward reference frame. Therefore, motion vectors of the forward and backward reference frames are scaled to generate the motion vectors that may be used to estimate 306 (see FIG. 3) the erroneous data of the current frame. The generated motion vectors pointing to the backward or the forward reference frame can be characterized as follows:

$$MV\_f\_x = MV\_x * N/M; \quad (1)$$

$$MV\_f\_y = MV\_y * N/M \quad (2)$$

where $MV\_f\_x$ and $MV\_f\_y$ are x and y components of the new motion vector, $Mv\_x$ and $MV\_y$ are x and y components of the non-erroneous reference motion vector, N is the distance from current frame to the forward or the backward reference frame, and M is the distance from the forward or backward reference frame to the frame from which the reference frame is predicted. Additional details involving motion vector scaling is discussed below with respect to FIGS. 7A and 7B.

Next, the motion vector merger 1706 of FIG. 2 merges 516 motion vectors. Motion vector merging 516 may provide support for variable block-size motion vectors. During motion vector merging 516, the scaled motion vectors of different block sizes are converted into a motion vector representing a uniform block size called a base unit. The size of the base unit is configurable. In some examples, a 16×16 pixel base unit is used.

If the base unit comprises several scaled motion vector of smaller size(s), a merging operation is applied to merge the motion vectors inside the base unit to a single motion vector and assign it to the base unit. However, if a scaled motion vector corresponds to a block that is bigger than a base unit, the input motion vector may be separated into several motion vectors each representing a base unit and each having the same motion vector as the scaled motion vector. Various examples are available to perform the merging operation. In one example, the new motion vector is the mean of the several scaled motion vector corresponding to smaller block sizes comprised in the base unit. In another example, the new motion vector is the average of the several scaled motion vectors comprised in the base unit. In another example, the new motion vector is the median of the several scaled motion vectors comprised in the base unit. After motion vector merging 516, the motion vectors have been converted to single-size base unit.

In some examples, the scaled (and possibly merged) motion vectors are smoothed 518. The motion vector smoothing 518 may comprise median filtering. The motion vector smoothing 518 may comprise average filtering or weighted average filtering. The previous blocks 514 and 516 modify the received motion vector field to be uniform sized (base unit size) forward and backward reference motion fields (motion vectors are scaled to point to the backward or forward reference frame from the current frame). Motion vector smoothing, e.g., median filtering, serves to remove or diminish singularities in the motion vectors introduced by the scaling 514 and merging 516 operations, and therefore, may yield better error concealment results.

Median filtering is used in signal and image processing to remove impulse noises while preserving edges at the same time. To obtain the median for an array of N scalars, $X=(x_1, x_2, \ldots x_N)$, with $x_i \in \mathfrak{R}$, for $i=1, 2, \ldots N$, usually the array is first sorted into $(\hat{x}_1, \hat{x}_2, \ldots \hat{x}_N)$. Then the element in the middle $\hat{x}_{N/2}$ is taken as the median $x_M$ of the array. The median $x_M$ satisfies the following property:

$$\sum_{i=1}^{N} |x_M - x_i| \le \sum_{i=1}^{N} |x_j - x_i| \qquad (3)$$
$$j = 1, 2, \cdots N$$

Similarly, for an array of N m-dimensional vectors, $V=(\vec{v}_1, \vec{v}_2, \ldots \vec{v}_N)$, with $\vec{v}_i \in \mathfrak{R}^m$, for $i=1, 2, \ldots N$, the median vector $\vec{v}_{VM}$ is the vector that satisfies the following constraint:

$$\sum_{i=1}^{N} \|\vec{v}_{VM} - \vec{v}_i\|_p \le \sum_{i=1}^{N} \|\vec{v}_j - \vec{v}_i\|_p \qquad (4)$$
$$j = 1, 2, \cdots N$$

where p denotes the p-norm metrics between the vectors. In one example, p=1 is used. For two-dimensional vector $\vec{v} = (v(x), v(y))$, the 1-norm distance between $\vec{v}_0$ and $\vec{v}_1$ is $$\|\vec{v}_0 - \vec{v}_1\|_{p=1} = |v_0(x) - v_1(x)| + |v_0(y) - v_1(y)| \qquad (5)$$

The motion vector median filtering can be applied to all available motion vectors. If a motion vector is from an erroneous macroblock, or from an intra-coded macroblock, the motion vector may be marked as un-available; otherwise, it may be labeled available. In one example, a 3×3 motion vector median filtering (VMF) is applied to each available motion vector. Each available motion vector is replaced by the median of the motion vectors in a 3×3 block centering on that motion vector. In other examples, a different size block may be used to perform the motion vector median filtering.

In short, the process of FIG. 5C for generating motion vectors for the bi-directionally predicted erroneous sections of the current frame, converts the input motion vectors of variable block sizes into base unit motion vectors corresponding to a base unit sized block of pixels. The process then converts the motion vectors used to predict the forward and/or backward reference frames into motion vectors that point from erroneous sections of the current frame to the reference frames. It should be noted that any one of the blocks illustrated in the flowchart shown I FIG. 5C may be omitted, rearranged in order, or combined with one or more other blocks.

FIGS. 7A and 7B show examples of the motion vector scaling 514 of FIG. 5C. In FIG. 7A, the current frame 700 is estimated based on a backward reference frame 710. A macroblock 712 in the backward reference frame 710 is predicted based on a non-erroneous motion vector 714 that references another backward reference frame 720. The motion vector 714 locates a macroblock-sized section of video data 722 in frame 720. Section 722 is shown as a dashed macroblock in frame 710 to illustrate the relative spatial locations of the macroblocks 712 and 722 as well as the motion vector 714. In order to estimate a section (e.g., the erroneous section to be concealed) of frame 700 based on the motion vector 714, scaling 514 is performed. Referring to equations (1) and (2) above, because the backward reference frame 710 is 1 frame away from frame 700 (N=1) and the non-erroneous motion vector 714 points to frame 720, which is 1 frame from frame 710 (M=1), the scaled motion vector x and y components are multiplied by a factor of one (N/M=1/1=1). Therefore the scaled motion vector 704 may be used to estimate an erroneous section of frame 700. It should be noted that the motion vector 704 points from a macroblock sized portion 702 that is not aligned with the macroblocks of frame 700 (it overlaps four other macroblocks). As is discussed in further detail below, the estimating of a macroblock section of frame 700 may comprise a scheme to decide which of the overlapped blocks in frame 700 can be estimated with the motion vector 704.

In FIG. 7B, the current frame 700 is estimated based on a forward reference frame 730. A macroblock 732 in the forward reference frame 730 is predicted based on a motion vector 734 that was referenced to the backward reference frame 710. The motion vector 734 locates a macroblock-sized section of video data 716 in frame 710. Section 716 is shown as a dashed macroblock in frame 730 to illustrate the relative locations of the macroblocks 732 and 716 as well as the motion vector 734. In order to estimate a section (e.g., one of the erroneous sections to be concealed) of frame 700 based on the motion vector 734, scaling 514 is performed. Since the forward reference frame 730 is 1 frames away from frame 700 (N=−1) and the transmitted motion vector 734 points two frames from frame 730 to frame 710 (M=2) the scaled motion vector x and y components are multiplied by a factor of −½ (N/M=−½=−0.5). Therefore the scaled motion vector 709 may be used to estimate an erroneous section of frame 700. It should be noted that the motion vector 709 points from a macroblock sized portion 706 that is not aligned with the macroblocks of frame 700 (it overlaps four other macroblocks). As another option, the motion vector could be generated to point to the backward frame 710 with N=1 and M=2. This results in a scaling factor of ½ (N/M=½=0.5). Therefore scaled motion vector 707 pointing to the backward reference frame 710 section 716 could be used to estimate an erroneous section of frame 700.

Figure 8:
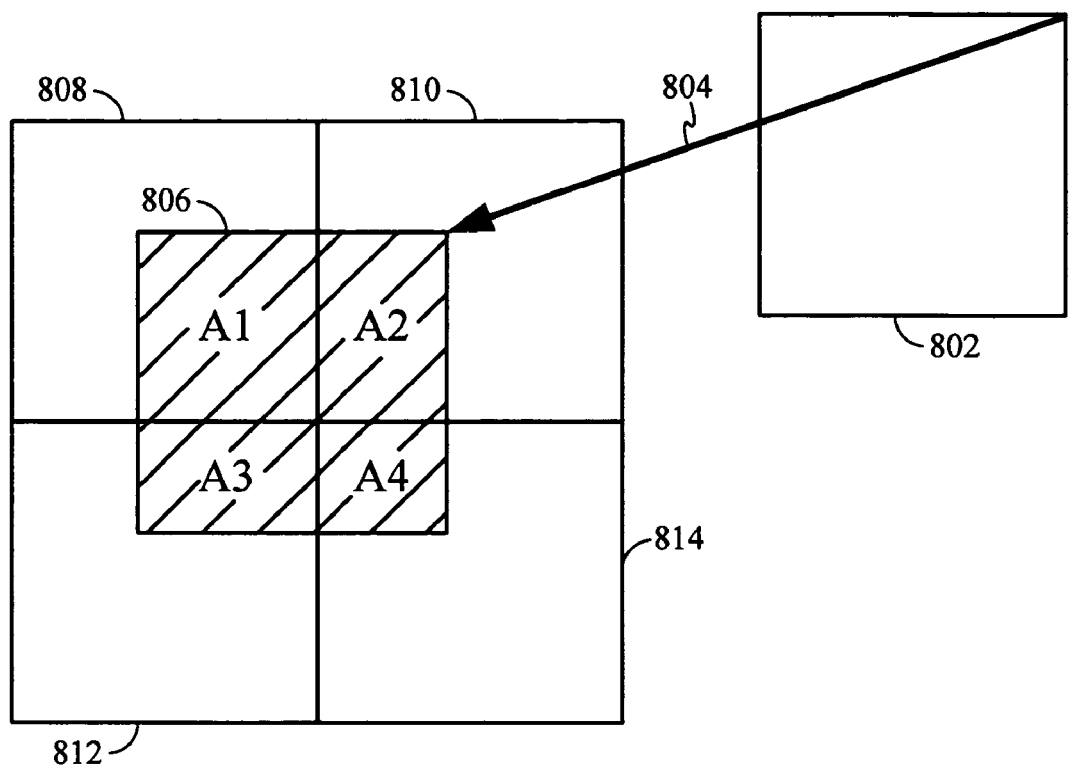
FIG. 8 illustrates a motion vector resulting in overlap of a reference section with erroneous sections to be estimated in a current frame.

As discussed above in reference to FIG. 5A, the reference data determiner 1712 determines (at 508) candidate reference sections that have scaled motion vectors that result in overlap of the erroneous sections to be concealed. In cases where multiple forward and/or backward candidate reference sections have scaled motion vectors that result in overlap of the erroneous section, a determination of which candidate reference section to use to estimate 306 (see FIG. 3) the erroneous section is performed. FIG. 8 shows an illustration of overlap of a reference section (resulting from a scaled motion vector of a candidate reference block) with multiple blocks in the current frame containing the erroneous section. A reference block 802 (from either a forward or a backward frame) has a scaled motion vector 804 as shown in FIG. 8. The scaled motion vector 804 points to the current frame containing erroneous data. The scaled motion vector 804, if applied to the reference block 802, moves the reference block 802 from its original position in its reference frame to a position 806 in the current reference frame. Scaled motion vectors result in overlap of four or fewer blocks in the current frame. In this example, the position 806 overlaps blocks 808, 810, 812 and 814. Cases where fewer than four blocks are overlapped include: 1) if one block is overlapped due to an exact overlap; 2) if 2 blocks are overlapped due to a perfect alignment in the vertical or horizontal direction; and 3) if the overlapped blocks are on the edge of the current frame.

In some examples, the method of determining 508 a candidate reference section utilizes a most covered area (MCA) rule. The most covered area rule assigns a candidate reference section to the erroneous section of the current frame that it overlaps the most. In one aspect, a percentage of overlap is used as a measure of overlap. In the example shown in FIG. 8, the motion vector 804 results in reference block 802 overlapping blocks 808, 810, 812 and 814 of the current frame (as depicted by the block at position 806). In this case, a higher percentage of block 808 is overlapped (the overlapped area of block 808 is labeled A1 in FIG. 8) than any of the blocks 810, 812 or 814 (overlapped areas labeled A2, A3 and A4, respectively). Therefore, the most covered area rule assigns the reference motion vector of block 802 to erroneous block 808 of the current frame.

The scaled motion vectors of other candidate reference blocks, besides block 802, may also result in overlap of block 808. If this is the case, then the motion vector resulting in the largest overlap of a reference section with a particular erroneous section may be determined to be the motion vector used to estimate 306 the erroneous section in the current frame.

Motion vectors of candidate reference sections in both the forward and the backward reference frames can be assigned to erroneous sections by using the greatest area rule. This results in assignment of a forward and a backward motion vector to each erroneous section. In some situations, there may not be a motion vector of a candidate reference section that results in overlap of an erroneous section. In cases where a forward reference section, or a backward reference section is determined 304 to contain temporal prediction data (e.g., a motion vector) resulting in overlap of an erroneous section, then a unidirectional mode may be used to estimate 306 the erroneous section. If no candidate reference blocks from the forward or the backward reference frames are determined to have motion vectors resulting in overlap of an erroneous section, then another method of concealment besides temporal concealment may be used (e.g, concealment with a collocated block of another frame).

In one example, the reference areas that are considered for determining 508 the forward and/or backward reference sections may be limited as discussed above and illustrated in FIG. 6. FIG. 6 illustrates using the limited forward reference area 615 for applying the most covered area (MCA) rule motion vector (MV) assignment to the erroneous section 404 of the current frame 600. Likewise, the backward reference area 625 is illustrated as being used for applying the most covered area rule motion vector assignment to the erroneous section 404 of the current frame 600.

A lack of a determined motion vector in the forward and/or the backward frame is one reason for using an estimation mode other than the bi-directional mode to estimate 306 the erroneous data. Another example of determining 506 (see FIG. 5A) the estimation mode will now be discussed.

Due to the bi-directional motion compensation feature of B-frames (or slices, or macroblocks), the compression efficiency for bi-directionally predicted sections is usually higher than those of intra-coded sections (e.g., I-frames and slices) and unidirectional predicted sections (e.g., P-frames and slices). Consequently, B-frame sizes are typically considerably smaller than I- and P-frame sizes and a portion of erroneous data of a given size may cover a larger frame area. Due to the increased processing that may be needed for the larger affected areas and the multiple motion vectors used for bi-directional prediction, some examples of methods of determining the estimation modes (unidirectional, bi-directional or other) of the erroneous sections use an outside to inside layered processing approach to provide strong influence of correctly received neighboring macroblocks motion vector and prediction mode information.

Referring to FIG. 4, the erroneous section 404 includes macroblocks in the uppermost and lowermost rows that border correctly received macroblocks 406. The erroneous section 404 also includes inner macroblocks that do not border any of the correctly received macroblocks 406. As the erroneous portions being estimated in the erroneous section 404 become further removed from the correctly received macroblocks 406, the concealment efficiency afforded by the motion vectors and/or prediction modes of the neighboring macroblocks may degrade. Therefore, the outside to inside layered approach to mode determination may change based on the location of the erroneous section relative to the correctly received and/or the already concealed sections.

To enhance the effect of the correctly received information from the neighboring macroblocks, three generations of motion vector and/or prediction/estimation mode information are considered when determining the estimation modes of the erroneous sections. The first generation information (the most influential) may comprise the motion vectors and/or prediction modes of the non-erroneous neighboring macroblocks. The second generation information comprises information of the erroneous macroblocks adjacent to the non-erroneous neighboring macroblocks and the third generation information comprises information of the erroneous macroblocks which have no immediate correctly received neighboring macroblocks. Each generation's information may comprise motion vector and/or prediction/estimation mode information at different reliability or confidence levels. Therefore, the method of determining the estimation modes may reflect these confidence or reliability levels. The first generation mode information may have the highest reliability since it is extracted from the correctly received neighboring macroblocks. The example mode determination algorithm is designed to allow the first generation information to have the strongest influence on the final mode decision for the neighboring erroneous macroblocks. The second generation mode information is derived from the estimation modes of macroblocks that were determined using the first generation mode information, and is considered to be comprised of less reliable information. The third generation mode information is derived from either the second generation or other neighboring third generation information.

Figure 5D:
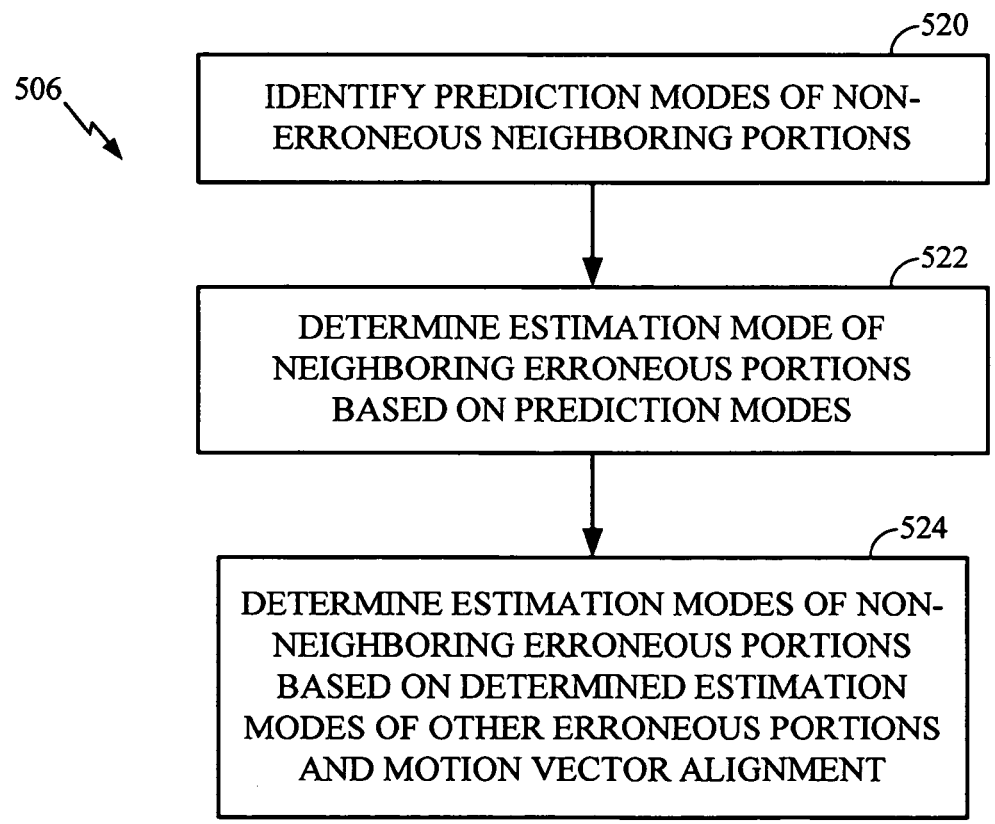
FIG. 5D shows a flow chart illustrating an example of the process to determine the estimation mode at block 506 of FIG. 5A.

FIG. 5D shows a flow chart illustrating an example of the process to determine 506 the erroneous section estimation mode of FIG. 5A. The estimation mode determiner 1714 of FIG. 2 identifies 520 the prediction modes of non-erroneous (e.g., correctly received) portions of multimedia data that neighbor the erroneous sections being concealed. In some examples, the non-erroneous portions and the erroneous sections being concealed comprise 16×16 pixel macroblocks, but other sized blocks may also be used as discussed above.

Prediction modes of the non-erroneous neighboring macroblocks include unidirectional prediction modes (as in P-frames) from one or more forward or backward reference frames, an intra-coded (non-predicted) mode, and the bidirectional prediction mode.

After determining 520 the prediction modes of the non-erroneous neighboring portions, the estimation mode determiner 1714 determines 522 the estimation mode of erroneous portions that neighbor the non-erroneous portions. The determination 522 is based, at least in part, on the determined prediction modes of the non-erroneous portions. In some examples, the estimation mode of an erroneous macroblock may be determined 522 to be the same as a non-erroneous neighboring macroblock's prediction mode or an erroneous neighboring macroblock's already determined estimation mode.

Since some temporal prediction sections may be as small as 4×4 pixels as in H.264, some examples of the estimation mode determination 522 may be based on the prediction modes and motion vectors of the four closest 4×4 pixel blocks for each neighboring macroblock. An erroneous macroblock may have up to 4 non-erroneous neighboring macroblocks. The neighboring macroblock motion vectors of various block sizes (e.g., 4×4, 4×8, 8×4, 8×8, 16×8, 8×16 and 16×16) may be over-sampled to form 16 motion vectors corresponding to 4×4 pixel sized blocks making up an entire macroblock. In some cases, the motion vectors that are closest to the erroneous macroblock may be the more reliable in terms of error concealment effects than those further removed. In some examples, the 4 immediate neighboring 4×4 pixel blocks and their corresponding prediction modes and motion vectors may be used in determining the estimation modes of the erroneous macroblock. FIG. 9 illustrates the 4×4 pixel blocks of non-erroneous macroblocks neighboring an erroneous macroblock. Macroblock 910 is a non-erroneous macroblock to the right of an erroneous macroblock (the erroneous macroblock is not shown in FIG. 9). The 4×4 pixel blocks labeled 0, 2, 8 and 10 of macroblock 910 may be used for determining the estimation mode of an erroneous macroblock with a non-erroneous neighbor to the right. The 4×4 pixel blocks labeled 10, 11, 14 and 15 of macroblock 920 may be used for determining the estimation mode of an erroneous macroblock with a non-erroneous neighbor to the top. The 4×4 pixel blocks labeled 5, 7, 13 and 15 of macroblock 930 may be used for determining the estimation mode of an erroneous macroblock with a non-erroneous neighbor to the left. The 4×4 pixel blocks labeled 0, 1, 4 and 5 of macroblock 940 may be used for determining the estimation mode of an erroneous macroblock with a non-erroneous neighbor to the bottom. If an erroneous macroblock has more than one non-erroneous neighboring macroblocks then a combined set of all the 4×4 pixel blocks may be used in determining the estimation mode.

Using the four prediction modes of the four closest 4×4 pixel blocks (as shown in FIG. 9) of a non-erroneous neighboring macroblock, the estimation mode of an erroneous macroblock may be determined 522 according to the criteria listed in Table 1.

TABLE 1

| Prediction Modes of 4 neighboring 4 × 4 pixel blocks | Determined Estimation Mode of the Erroneous Neighboring Macroblock |
|---|---|
| All 4 are Intra-coded mode | Non-motion-compensated (e.g., spatial concealment) Estimation |
| All 4 are unidirectional Forward | Unidirectional Forward Estimation |
| All 4 are unidirectional Backward | Unidirectional Backward Estimation |
| All other cases | Bi-directional Estimation |

The criteria listed in Table 1 gives a bias towards using bi-directional estimation of erroneous sections. If all four of the non-erroneous 4×4 pixel neighboring blocks are of the same prediction mode, the estimation mode differs from bi-directional. The criteria in Table 1 could be changed to perform one of the non-bi-directional estimation modes if 3 or more of the 4 neighboring 4×4 pixel blocks are of the same mode. Other methods of determining the estimation mode of an erroneous block based on the prediction mode (or modes) of neighboring blocks could also be used.

If an erroneous macroblock has no neighboring non-erroneous macroblocks, but has neighboring macroblocks that neighbor non-erroneous macroblocks, then the criteria for determining the estimation mode may be based less on the prediction modes of the neighboring macroblocks. In some examples, the criteria for determining the estimation mode of an interior macroblock (a macroblock that does not neighbor a non-erroneous macroblock) is based on the determined estimation mode of one or more already determined (erroneous and to be concealed, or already concealed) macroblocks and the alignment of the scaled forward and backward motion vectors as generated in Block 504 in FIG. 5A.

For the case where the erroneous macroblock's forward and backward scaled motion vectors are aligned (e.g., the absolute difference of x-component or y-component of the forward and backward scaled motion vectors are smaller than a predefined threshold), if the determined estimation modes of all the already-determined macroblocks are unidirectional (either all forward or all backward), the mode of the current erroneous macroblock is assigned as the unidirectional mode (forward or backward respectively); if the determined estimation modes of the neighboring outer located macroblocks are of more than one type, then the mode of the current macroblock is assigned as bi-directional mode. For the case where the erroneous macroblock's forward and backward scaled motion vectors are not aligned (e.g., the absolute difference of x-component or y-component of the forward and backward scaled motion vectors are larger than a predefined threshold), the mode for the current erroneous macroblock is assigned as the majority mode of the available already-determined neighboring macroblocks. Other methods of determining the estimation mode based on the determined estimation modes of neighboring macroblocks may also be used.

For an erroneous macroblock that is at least two or more macroblocks removed from any non-erroneous macroblocks (separated from any non-erroneous macroblocks by two or more intervening erroneous or previously erroneous macroblocks), the criteria for determining the estimation mode may be based even less on the prediction/estimation modes of the neighboring macroblocks. In this case, the estimation mode of a current erroneous macroblock may be determined based on a combination of all neighboring macroblocks already-determined estimation modes and the current erroneous macroblock's scaled motion vector alignment. For the case where the current macroblock's forward and backward scaled motion vectors are aligned (the absolute difference of x-component or y-component of the forward and backward motion vectors are smaller than a predefined threshold), the mode of the current MB is assigned as the bi-directional mode. For the case of current MB's forward and backward motion vectors are not aligned (the absolute difference of x-component or y-component of the forward and backward motion vectors are larger than a predefined threshold), the mode for the current erroneous macroblock is assigned as the majority mode of the available already-determined neighboring mocroblock estimation modes. Other methods of determining the estimation mode of an erroneous macroblock based on the determined estimation modes of neighboring macroblocks may also be used.

It should be noted that the process for limiting the reference areas for determining the temporal prediction data (see 304 of FIG. 3), as discussed above in relation to FIG. 6, could utilize the over-sampled 4×4 pixel block motion vectors for identifying the uppermost and lower most bounds (and also the right most and left most bounds in some examples) of the limited reference areas (see areas 615 and 625 in FIG. 6).

It should be noted that any one of the blocks illustrated in the flowchart shown in FIG. 5A may be omitted, rearranged in order, or combined with one or more other blocks.

An example provides an apparatus for processing bi-directionally predicted multimedia data comprising a first section received in error. The example apparatus includes means for determining temporal prediction data for the first section received in error, wherein the temporal prediction data corresponds to a first forward reference section and a first backward reference section, and means for estimating the first section based at least in part on one or both of the first forward reference section and the first backward reference section. The means for determining the temporal prediction data may comprise the temporal prediction determiner 170 of FIGS. 1 and 2. The means for estimating the first section may comprise the erroneous data estimator 1716 of FIG. 2.

Figure 10:
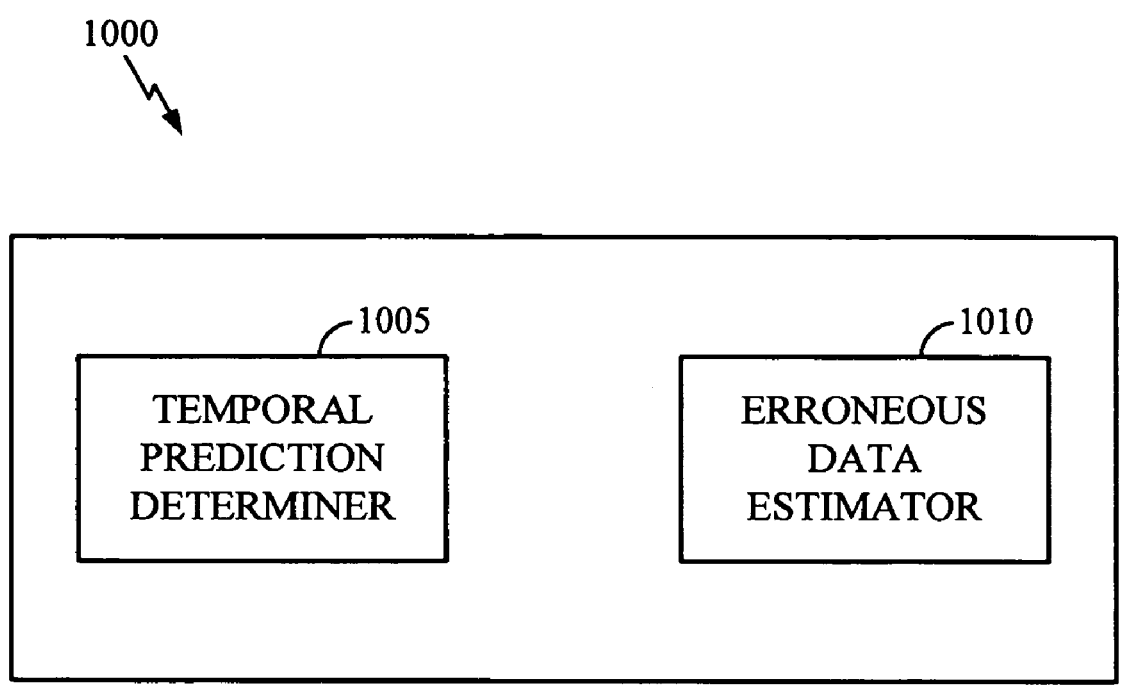
FIG. 10 shows a block diagram illustrating an example of an apparatus for processing bi-directionally predicted multimedia data comprising a first section received in error.

FIG. 10 shows a block diagram illustrating an example of an apparatus for processing bi-directionally predicted multimedia data comprising a first section received in error. The example apparatus 1000 of FIG. 10 includes means for determining temporal prediction data for the first section received in error, wherein the temporal prediction data corresponds to a first forward reference section and a first backward reference section, and means for estimating the first section based at least in part on one or both of the first forward reference section and the first backward reference section. The means for determining the temporal prediction data may comprises a temporal prediction determiner 1005 of FIG. 10. The means for estimating the first section may comprises an erroneous data estimator 1010 of FIG. 10.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

Thus, methods and apparatus to perform temporal error concealment of erroneous bidirectional predicted multimedia data have been described.

What is claimed is:

1. A method of processing bi-directionally predicted multimedia data comprising a first section received in error, the method comprising:

identifying, by a decoder hardware device, a first forward reference section and a first backward reference section based upon a determination of motion vectors associated with regions of the first forward reference section and the first backward reference section, such that the regions, when moved along the respective motion vectors, overlap regions of the first section received in error, wherein the first forward reference section is contained in a forward reference frame, and wherein the first backward reference section is contained in a backward reference frame;

determining, by the decoder hardware device, temporal prediction data for the first section received in error, wherein the temporal prediction data corresponds to the first forward reference section and the first backward reference section; and estimating, by the decoder hardware device, the first section received in error based on at least one of the first forward reference section and the first backward reference section.

2. The method of claim 1, wherein the temporal prediction data comprises the motion vectors associated with the regions of the first forward reference section and the first backward reference section.

3. The method of claim 1, wherein the determining further comprises processing a plurality of forward candidate reference sections and a plurality of backward candidate reference sections to determine the first forward reference section and the first backward reference section.

4. The method of claim 3, further comprising:

scaling motion vectors corresponding to the plurality of forward candidate reference sections and the plurality of backward candidate reference sections such that the scaled motion vectors correspond to a frame containing the first section.

5. The method of claim 4, wherein the scaling of the motion vectors results in at least one of the plurality of forward candidate reference sections and the backward candidate reference sections overlapping the first section, and further wherein the estimating further comprises estimating the first section based on the at least one overlapping candidate reference sections.

6. The method of claim 4, wherein the scaling of the motion vectors results in a plurality of forward candidate reference sections overlapping the first section and a plurality of backward candidate reference sections overlapping the first section, and further wherein estimating the first section further comprises estimating the first section based on one or both of a forward candidate reference section that results in a largest overlap of the forward candidate sections, and a backward candidate reference section that results in a largest overlap of the backward candidate sections.

7. The method of claim 4, further comprising smoothing the scaled motion vectors.

8. The method of claim 7, wherein the smoothing comprises median filtering.

9. The method of claim 3, further comprising:
merging motion vectors corresponding to two or more of the plurality of forward candidate reference sections to form one or more base motion vectors corresponding to one or more base unit portions of the first forward reference section; and
merging motion vectors corresponding to two or more of the plurality of backward candidate reference sections to form one or more base motion vectors corresponding to one or more base unit portions of the first backward reference section;
wherein the base unit portions contain the sections corresponding to the merged motion vectors and the base unit portions are N by M blocks of pixels, and further wherein N and M are integers.

10. The method of claim 9, wherein merging the motion vectors comprises at least one of simple averaging, weighted averaging and median filtering.

11. The method of claim 3, further comprising: limiting the plurality of forward candidate reference sections and backward candidate reference sections used in determining the temporal prediction data to sections bounded by motion vectors corresponding to non-erroneous portions of multimedia data that neighbor the first section.

12. The method of claim 1, wherein the first forward reference section, the first backward reference section and the first section are the same size.

13. The method of claim 1, further comprising:
determining a mode of estimating the first section based at least in part on one or more prediction modes of non-erroneous portions of multimedia data neighboring the first section.

14. The method of claim 1, further comprising:
determining a mode of estimating one or more first portions of the first section received in error based at least in part on one or more prediction modes of non-erroneous portions of multimedia data neighboring the first portions of the first section; and
determining a mode of estimating one or more second portions of the first section based at least in part on one or more of the determined modes of the first portions neighboring the second portions, wherein the one or more second portions do not neighbor any non-erroneous portions.

15. The method of claim 14, wherein determining the mode of estimating the one or more second portions further comprises:
determining the mode of estimating the one or more second portions based at least in part on a relative alignment of a forward motion vector and a backward motion vector, wherein the forward motion vector corresponds the first forward reference section, and the backward motion vector corresponds to the first backward reference section.

16. A processor for processing bi-directionally predicted multimedia data comprising a first section received in error, the processor configured to:
identify a first forward reference section and a first backward reference section based upon a determination of motion vectors associated with regions of the first forward reference section and the first backward reference section, such that the regions, when moved along the respective motion vectors, overlap regions of the first section received in error, wherein the first forward reference section is contained in a forward reference frame, and wherein the first backward reference section is contained in a backward reference frame;
determine temporal prediction data for the first section received in error, wherein the temporal prediction data corresponds to the first forward reference section and the first backward reference section; and
estimate the first section received in error based on at least one of the first forward reference section and the first backward reference section.

17. The processor of claim 16, wherein the processor is further configured to determine the first forward reference section and the first backward reference section by processing a plurality of forward candidate reference sections and a plurality of backward candidate reference sections.

18. The processor of claim 17, wherein the processor is further configured to scale motion vectors corresponding to the plurality of forward candidate reference sections and the plurality of backward candidate reference sections such that the scaled motion vectors correspond to a frame containing the first section.

19. The processor of claim 18, wherein the processor is further configured to smooth the scaled motion vectors.

20. The processor of claim 17, wherein the processor is further configured to:
merge motion vectors corresponding to two or more of the plurality of forward candidate reference sections to form one or more base motion vectors corresponding to one or more base unit portions of the first forward reference section; and
merge motion vectors corresponding to two or more of the plurality of backward candidate reference sections to form one or more base motion vectors corresponding to one or more base unit portions of the first backward reference section;
wherein the base unit portions contain the sections corresponding to the merged motion vectors and the base unit portions are N by M blocks of pixels, and further wherein N and M are integers.

21. The processor of claim 17, wherein the processor is further configured to limit the plurality of forward candidate reference sections and backward candidate reference sections used to determine the temporal prediction data, to sections bounded by motion vectors corresponding to non-erroneous portions of multimedia data that neighbor the first section.

22. The processor of claim 16, wherein the processor is further configured to determine a mode of estimating the first section based at least in part on one or more prediction modes of non-erroneous portions of multimedia data neighboring the first section.

23. The processor of claim 16, wherein the processor is further configured to:
 determine a mode to estimate one or more first portions of the first section received in error based at least in part on one or more prediction modes of non-erroneous portions of multimedia data neighboring the first portions of the first section; and
 determine a mode to estimate one or more second portions of the first section based at least in part on one or more of the determined modes of the first portions neighboring the second portions, wherein the one or more second portions do not neighbor any non-erroneous portions.

24. The processor of claim 23, wherein the processor is further configured to determine the mode to estimate the one or more second portions based at least in part on a relative alignment of a forward motion vector and a backward motion vector, wherein the forward motion vector corresponds the first forward reference section, and the backward motion vector corresponds to the first backward reference section.

25. An apparatus for processing bi-directionally predicted multimedia data comprising a first section received in error, the apparatus comprising:
 a decoder hardware device;
 an identifier implemented in the decoder hardware device to identify a first forward reference section and a first backward reference section based upon a determination of motion vectors associated with regions of the first forward reference section and the first backward reference section, such that the regions, when moved along the respective motion vectors, overlap regions of the first section received in error, wherein the first forward reference section is contained in a forward reference frame, and wherein the first backward reference section is contained in a backward reference frame;
 a determiner implemented in the decoder hardware device to determine temporal prediction data for the first section received in error, wherein the temporal prediction data corresponds to the first forward reference section and the first backward reference section; and
 an estimator implemented in the decoder hardware device to estimate the first section received in error based on at least one of the first forward reference section and the first backward reference section.

26. The apparatus of claim 25, wherein the temporal prediction data comprises the motion vectors associated with the regions of the first forward reference section and the first backward reference section.

27. The apparatus of claim 25, wherein the determiner determines the first forward reference section and the first backward reference section by processing a plurality of forward candidate reference sections and a plurality of backward candidate reference sections.

28. The apparatus of claim 27, wherein the apparatus further comprises a scaler implemented in the decoder hardware device to scale motion vectors corresponding to the plurality of forward candidate reference sections and the plurality of backward candidate reference sections such that the scaled motion vectors correspond to a frame containing the first section.

29. The apparatus of claim 28, wherein the scaled motion vectors result in at least one of the plurality of forward candidate reference sections and the backward candidate reference sections overlapping the first section, and wherein the estimator estimates the first section based on the at least one overlapping candidate reference section.

30. The apparatus of claim 28, wherein the scaled motion vectors result in a plurality of forward candidate reference sections overlapping the first section and a plurality of backward candidate reference sections overlapping the first section, and the estimator estimates the first section based on one or both of a forward candidate reference section that results in a largest overlap of the forward candidate sections, and a backward candidate reference section that results in a largest overlap of the backward candidate sections.

31. The apparatus of claim 28, wherein the apparatus further comprises a smoother implemented in the decoder hardware device to smooth the scaled motion vectors.

32. The apparatus of claim 27, wherein the apparatus further comprises:
 a merger implemented in the decoder hardware device to merge motion vectors corresponding to two or more of the plurality of forward candidate reference sections to form one or more base motion vectors corresponding to one or more base unit portions of the first forward reference section, and to merge motion vectors corresponding to two or more of the plurality of backward candidate reference sections to form one or more base motion vectors corresponding to one or more base unit portions of the first backward reference section;
 wherein the base unit portions contain the sections corresponding to the merged motion vectors and the base unit portions are N by M blocks of pixels, and further wherein N and M are integers.

33. The apparatus of claim 27, further comprising: a limiter implemented in the decoder hardware device to limit the plurality of forward candidate reference sections and backward candidate reference sections used to determine the temporal prediction data, to sections bounded by motion vectors corresponding to non-erroneous portions of multimedia data that neighbor the first section.

34. The apparatus of claim 25, further comprising:
 a second determiner implemented in the decoder hardware device to determine a mode to estimate the first section based at least in part on one or more prediction modes of non-erroneous portions of multimedia data neighboring the first section.

35. The apparatus of claim 25, further comprising:
 a second determiner implemented in the decoder hardware device to determine a mode to estimate one or more first portions of the first section received in error based at least in part on one or more prediction modes of non-erroneous portions of multimedia data neighboring the first portions of the first section, and to determine a mode to estimate one or more second portions of the first section based at least in part on one or more of the determined modes of the first portions neighboring the second portions, wherein the one or more second portions do not neighbor any non-erroneous portions.

36. The apparatus of claim 35, wherein the second determiner determines the mode to estimate the one or more second portions based at least in part on a relative alignment of a forward motion vector and a backward motion vector, wherein the forward motion vector corresponds the first forward reference section, and the backward motion vector corresponds to the first backward reference section.

37. An apparatus for processing bi-directionally predicted multimedia data comprising a first section received in error, the apparatus comprising:

means for identifying a first forward reference section and a first backward reference section based upon a determination of motion vectors associated with regions of the first forward reference section and the first backward reference section, such that the regions, when moved along the respective motion vectors, overlap regions of the first section received in error, wherein the first forward reference section is contained in a forward reference frame, and wherein the first backward reference section is contained in a backward reference frame;

means for determining temporal prediction data for the first section received in error, wherein the temporal prediction data corresponds to the first forward reference section and the first backward reference section; and means for estimating the first section received in error based on at least one of the first forward reference section and the first backward reference section.

38. The apparatus of claim 37, wherein the means for determining processes a plurality of forward candidate reference sections and a plurality of backward candidate reference sections for determining the first forward reference section and the first backward reference section.

39. The apparatus of claim 38, further comprising:

means for scaling motion vectors corresponding to the plurality of forward candidate reference sections and the plurality of backward candidate reference sections such that the scaled motion vectors correspond to a frame containing the first section.

40. The apparatus of claim 39, wherein the scaling of the motion vectors results in at least one of the plurality of forward candidate reference sections and the backward candidate reference sections overlapping the first section, and further wherein the means for estimating estimates the first section based on the at least one overlapping candidate reference sections.

41. The apparatus of claim 39, wherein the scaling of the motion vectors results in a plurality of forward candidate reference sections overlapping the first section and a plurality of backward candidate reference sections overlapping the first section, and further wherein the means for estimating the first section estimates the first section based on one or both of a forward candidate reference section that results in a largest overlap of the forward candidate sections, and a backward candidate reference section that results in a largest overlap of the backward candidate sections.

42. The apparatus of claim 39, further comprising means for smoothing the scaled motion vectors.

43. The apparatus of claim 38, further comprising:

means for merging motion vectors corresponding to two or more of the plurality of forward candidate reference sections to form one, or more base motion vectors corresponding to one or more base unit portions of the first forward reference section, and means for merging motion vectors corresponding to two or more of the plurality of backward candidate reference sections to form one or more base motion vectors corresponding to one or more base unit portions of the first backward reference section; and wherein the base unit portions contain the sections corresponding to the merged motion vectors and the base unit portions are N by M blocks of pixels, and further wherein N and M are integers.

44. The apparatus of claim 43, wherein the means for merging merges the motion vectors using at least one of simple averaging, weighted averaging and median filtering.

45. The apparatus of claim 38, further comprising means for limiting the plurality of forward candidate reference sections and backward candidate reference sections used in determining the temporal prediction data, to sections bounded by motion vectors corresponding to non-erroneous portions of multimedia data that neighbor the first section.

46. The apparatus of claim 37, wherein the first forward reference section, the first backward reference section and the first section are the same size.

47. The apparatus of claim 37, further comprising:

means for determining a mode of estimating the first section based at least in part on one or more prediction modes of non-erroneous portions of multimedia data neighboring the first section.

48. The apparatus of claim 37, further comprising:

means for determining a mode of estimating one or more first portions of the first section received in error based at least in part on one or more prediction modes of non-erroneous portions of multimedia data neighboring the first portions of the first section; and means for determining a mode of estimating one or more second portions of the first section based at least in part on one or more of the determined modes of the first portions neighboring the second portions, wherein the one or more second portions do not neighbor any non-erroneous portions.

49. The apparatus of claim 48, wherein the means for determining the mode of estimating the one or more second portions determines the mode of estimating the one or more second portions based at least in part on a relative alignment of a forward motion vector and a backward motion vector, wherein the forward motion vector corresponds the first forward reference section, and the backward motion vector corresponds to the first backward reference section.

50. A computer readable storage medium encoded with computer readable instructions for causing a processor to:

identify a first forward reference section and a first backward reference section based upon a determination of motion vectors associated with regions of the first forward reference section and the first backward reference section, such that the regions, when moved along the respective motion vectors, overlap regions of the first section received in error, wherein the first forward reference section is contained in a forward reference frame, and wherein the first backward reference section is contained in a backward reference frame;

determine temporal prediction data for the first section received in error, wherein the temporal prediction data corresponds to the first forward reference section and the first backward reference section; and estimate the first section received in error based on at least one of the first forward reference section and the first backward reference section.

51. The computer readable storage medium of claim 50, wherein the computer readable instructions for causing the processor to determine the temporal prediction data comprise computer readable instructions for causing the processor to process a plurality of forward candidate reference sections and a plurality of backward candidate reference sections to determine the first forward reference section and the first backward reference section.

52. The computer readable storage medium of claim 51, wherein the computer readable storage medium is further encoded with computer readable instructions for causing the processor to:
  scale motion vectors corresponding to the plurality of forward candidate reference sections and the plurality of backward candidate reference sections such that the scaled motion vectors correspond to the frame containing the first section.

53. The computer readable storage medium of claim 52, wherein the computer readable storage medium is further encoded with computer readable instructions for causing the processor to smooth the scaled motion vectors.

54. The computer readable storage medium of claim 51, wherein the computer readable storage medium is further encoded with computer readable instructions for causing the processor to:
  merge motion vectors corresponding to two or more of the plurality of forward candidate reference sections to form one or more base motion vectors corresponding to one or more base unit portions of the first forward reference section; and
  merge motion vectors corresponding to two or more of the plurality of backward candidate reference sections to form one or more base motion vectors corresponding to one or more base unit portions of the first backward reference section,
  wherein the base unit portions contain the sections corresponding to the merged motion vectors and the base unit portions are N by M blocks of pixels, and further wherein N and M are integers.

55. The computer readable storage medium of claim 51, wherein the computer readable storage medium is further encoded with computer readable instructions for causing the processor to limit the plurality of forward candidate reference sections and backward candidate reference sections used in determining the temporal prediction data, to sections bounded by motion vectors corresponding to non-erroneous portions of multimedia data that neighbor the first section.

56. The computer readable storage medium of claim 50, wherein the computer readable storage medium is further encoded with computer readable instructions for causing the processor to determine a mode of estimating the first section based at least in part on one or more prediction modes of non-erroneous portions of multimedia data neighboring the first section.

57. The computer readable storage medium of claim 50, wherein the computer readable storage medium is further encoded with computer readable instructions for causing the processor to:
  determine a mode of estimating one or more first portions of the first section received in error based at least in part on one or more prediction modes of non-erroneous portions of multimedia data neighboring the first portions of the first section; and
  determine a mode of estimating one or more second portions of the first section based at least in part on one or more of the determined modes of the first portions neighboring the second portions , wherein the one or more second portions do not neighbor any non-erroneous portions.

58. The computer readable storage medium of claim 57, wherein the computer readable instructions for causing the processor to determine the mode of estimating the one or more second portions comprise computer readable instructions for causing the processor to:
  determine the mode of estimating the one or more second portions based at least in part on a relative alignment of a forward motion vector and a backward motion vector, wherein the forward motion vector corresponds the first forward reference section, and the backward motion vector corresponds to the first backward reference section.

59. The method of claim 1, wherein one or more of the identifying, determining, and estimating are performed by a processor contained within the decoder hardware device.

60. The apparatus of claim 25, wherein the decoder hardware device comprises a processor, and wherein one or more of the identifier, the determiner, and the estimator are executable by the processor of the decoder hardware device.

* * * * *

UNITED STATES PATENT AND TRADEMARK OFFICE
CERTIFICATE OF CORRECTION

PATENT NO. : 7,660,354 B2 Page 1 of 1
APPLICATION NO. : 11/432030
DATED : February 9, 2010
INVENTOR(S) : Shi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 613 days.

Signed and Sealed this

Twenty-eighth Day of December, 2010

David J. Kappos
*Director of the United States Patent and Trademark Office*